United States Patent Office 2,869,320
Patented Jan. 20, 1959

2,869,320
HYPERGOLIC FUEL AND ITS METHOD OF USE IN DEVELOPING THRUST

Joe M. Burton, Waco, Tex., assignor to Phillips Petroleum Company, a corporation of Delaware No Drawing. Application July 6, 1954
Serial No. 441,624

4 Claims. (Cl. 60—35.4)

This invention relates to rocket propellants. In one of its more specific aspects, the invention relates to hypergolic fuel. In another of its more specific aspects, the invention relates to the application of hypergolic fuels to the propulsion of rockets. In another of its more specific aspects, the invention relates to fast-burning fuels.

My invention is concerned with new and novel rocket propellants and their utilization. A rocket, or jet propulsion device, is defined herein as a rigid container for matter and energy, so arranged that a portion of the matter can absorb energy in kinetic form and subsequently be ejected in a specified direction. The type rocket to which my invention is applied is that type of jet propulsion device designated as a "pure" rocket, i. e., a thrust producer which does not make use of the surrounding atmosphere. A rocket of the type with which my invention is concerned is propelled by introduction of a propellant material into a combustion chamber therein, and burning it under conditions that will cause it to release energy at a high but controllable rate immediately after entering into the combustion chamber. Rocket propellants, as liquids, are advantageously utilized, inasmuch as the liquid propellant material can be carried in a light-weight, low-pressure vessel and pumped into the combustion chamber, the latter, though it must withstand high pressure and temperature, being only necessarily large enough to insure combustion. Also, the flow of liquid propellant into the combustion chamber can be regulated at will so that the thrust, continuous or an intermittent burst of power, can be sustained. The latter type of liquid propellant flow contributes to a longer life of the combustion chamber and thrust nozzle.

Various liquids and liquid combinations have been found useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component, such as ethyl alcohol-water, ammonia, hydrazine, or hydrogen; and nitric acid as the oxidizer with aniline or a furfuryl alcohol as the hypergolic fuel component.

When employing a concentrated "white fuming nitric acid," e. g., having a concentration in the neighborhood of 90 to 100 percent, as the oxidizer in a rocket propellant, it is often necessary, dependent on the specific fuel component, to make ignition more prompt by dissolving from 6 to 14 percent by weight of nitrogen dioxide in the white fuming nitric acid, forming thereby "red fuming" nitric acid. A fuel component of a bipropellant material of the type described herein is spontaneously ignited upon contacting the oxidizer and, for that reason, is referred to herein as being "hypergolic." A ratio of oxidizer to hypergolic fuel, based on stoichiometric amounts, can be utilized within the limits of 0.5:1 to 1.5:1, if desired, the efficiency of the combustion being less at ratios below 1:1 and the use of the oxidizer being less economical at ratios above 1:1. However, tactical consideration may necessitate the use of higher ranges, even as high as 6:1.

The following are objects of this invention.

An object of this invention is to provide new rocket propellants. Another object of the invention is to provide an improved hypergolic fuel. Another object of the invention is to provide a method for imparting immediate thrust to a rocket. Another object of the invention is to provide a rocket propellant having a freezing point suitable to make such propellant useful at low temperatures. Other and further objects of this invention will be apparent to those skilled in the art upon study of this disclosure.

Pyrrole has been known as a fuel component in a bipropellant system. The use of this material has been accompanied by attendant disadvantages, however, for pyrrole has a freezing point of −24° C. (−11° F.). Obviously, unless that freezing point is lowered, use of that fuel in a rocket would be impractical.

Broadly speaking, this invention comprises a novel fuel composition which is a mixture of pyrrole and pyridine. Pyridine, if it is in itself hypergolic, has an ignition delay in excess of 100 milliseconds. However, this material does have the beneficial property of having a solidification point of −42° C. (−44° F.). I have discovered that by blending pyrrole and pyridine together, the freezing point of the mixture is well below the freezing point of pyrrole and the mixture has an average ignition delay which is very close to the ignition delay of pyrrole.

In accordance with this invention, I have provided a novel bipropellant fuel which comprises pyrrole and pyridine. For practical use as a rocket propellant, the freezing point of a fuel must be at least as low as −34° C. (−29° F.). I have found that a fuel having such a freezing point characteristic is obtained by mixing a minor amount of pyridine with a major amount of pyrrole. The amount of pyrrole in the mixture is in the range of from 60 to 80 percent by volume with from 40 to 20 percent pyridine. For the best combination of freezing point and ignition delay characteristics, I prefer to use a mixture of from 70 to 80 percent of pyrrole in admixture with from 30 to 20 percent by volume of pyridine.

Other oxidizers are suitable as oxidants for these hypergolic fuels, in addition to white or red fuming nitric acid, and can be used in the bipropellant fuel composition of my invention. Suitable oxidants include materials such as hydrogen peroxide, ozone, nitrogen tetroxide, liquid oxygen, and mixed mineral acids, especially anhydrous mixtures of nitric and sulfuric acids, such as 80 to 90 percent by volume white or red fuming nitric acids and 10 to 20 percent by volume anhydrous or fuming sulfuric acid. It is within the scope of this invention to employ, preferably dissolved in the oxidizer, ignition catalysts or oxidation catalysts. These oxidation catalysts include certain metal salts, such as the chlorides and naphthenates of iron, zinc, cobalt and similar heavy materials.

The advantages of this invention are illustrated in the following example. The reactants and their proportions are presented as being typical and are not to be construed as unduly limiting of the invention.

*Example*

Ignition delay data are presented hereinbelow which clearly demonstrate the advantage of utilizing my preferred mixture of pyrrole and pyridine when using white fuming nitric acid as the oxidizer. These data, obtained with drop test apparatus, are presented in the table below. The fuel blends were tested at −40° C. (−40° F.),

| Fuel Blends (In Volume Percent) | Solidification Point, °F. | Average Ignition Delay, Millisec. | Average Deviation, Millisec. | Deviation, Percent |
|---|---|---|---|---|
| 100% Pyrrole | −11 | [1] 9 | | |
| 80% Pyrrole—20% Pyridine | −34 | [2] 12 | 1.0 | 8.3 |
| 70% Pyrrole—30% Pyridine | −54 | 17 | 1.2 | 7.1 |
| 100% Pyridine | −44 | | | |

[1] Determined at 75° F.
[2] Supercooled in test tube.

As will be evident to those skilled in the art, various modifications of this invention can be made or followed in the light of this disclosure without departing from the spirit or the scope of this invention.

I claim:

1. A fuel composition comprising between 70 and 80 percent by volume of pyrrole and between 30 and 20 percent by volume of pyridine.

2. In the method for developing thrust by the combustion of bipropellant components in a combustion chamber of a reaction motor the steps comprising separately and simultaneously injecting a stream of an oxidant component and a stream of a fuel component into contact with each other in the combustion chamber of said motor, in such proportions as to produce spontaneous ignition, said fuel component consisting essentially of between 70 and 80 percent by volume of pyrrole and between 30 and 20 percent by volume of pyridine.

3. A fuel composition according to claim 1 having an ignition delay of not more than about 17 milliseconds and a freezing point between about −34° F. and about −54° F.

4. The method of claim 2 wherein said fuel component has an ignition delay of not more than about 17 milliseconds and a freezing point between about −34° F. and about −54° F.

References Cited in the file of this patent

UNITED STATES PATENTS

| 2,573,471 | Malina et al. | Oct. 30, 1951 |
| 2,712,496 | Skolnik et al. | July 5, 1955 |
| 2,768,888 | Ryker | Oct. 30, 1956 |
| 2,774,214 | Malina et al. | Dec. 18, 1956 |